UNITED STATES PATENT OFFICE.

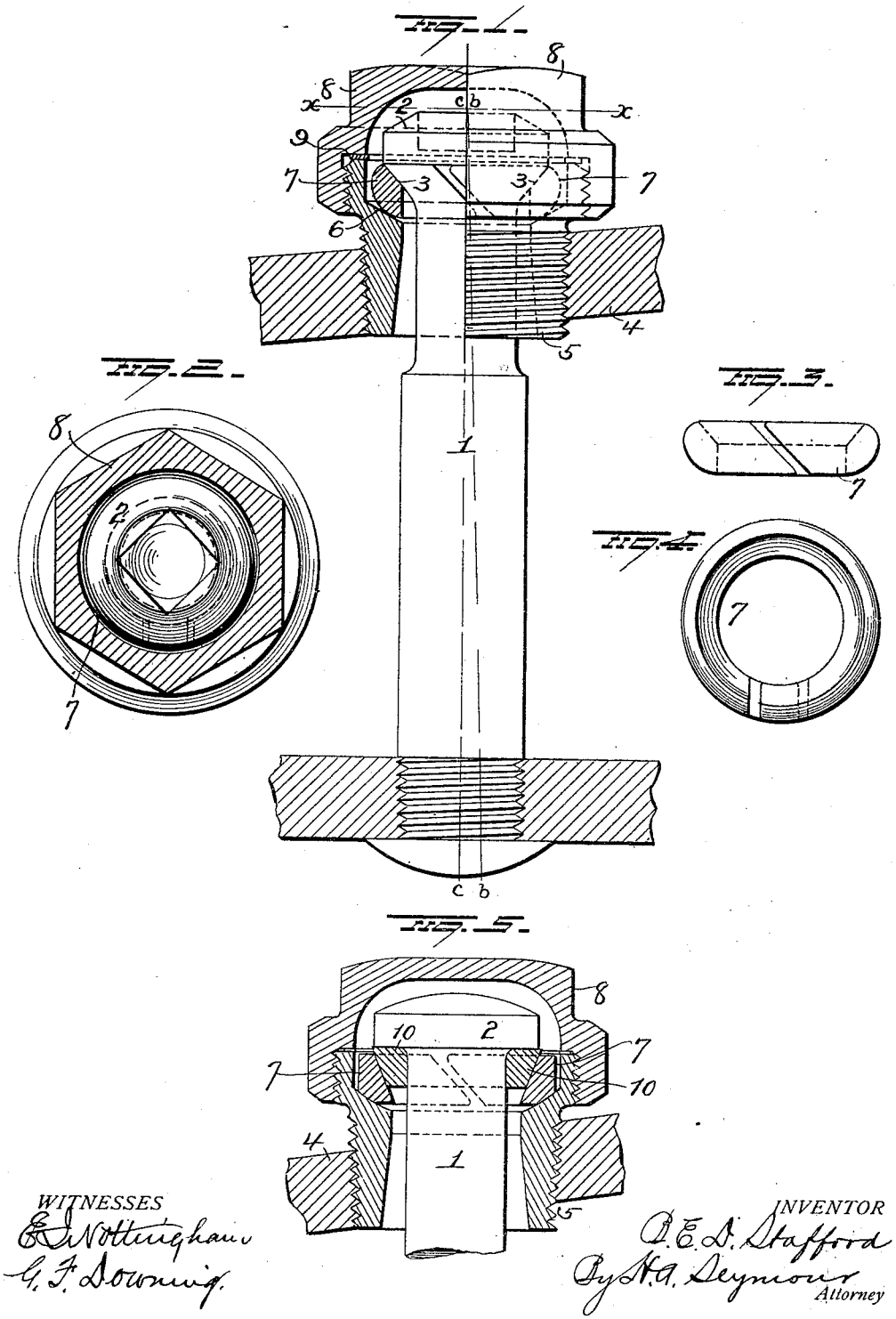

BENJAMIN E. D. STAFFORD, OF PITTSBURGH, PENNSYLVANIA, ASSIGNOR TO FLANNERY BOLT COMPANY, OF PITTSBURGH, PENNSYLVANIA.

FLEXIBLE STAY-BOLT.

1,119,656.  Specification of Letters Patent.  Patented Dec. 1, 1914.

Application filed April 1, 1914. Serial No. 828,869.

*To all whom it may concern:*

Be it known that I, BENJAMIN E. D. STAFFORD, of Pittsburgh, in the county of Allegheny and State of Pennsylvania, have invented certain new and useful Improvements in Flexible Stay-Bolts; and I do hereby declare the following to be a full, clear, and exact description of the invention, such as will enable others skilled in the art to which it appertains to make and use the same.

My invention relates to an improvement in flexible stay bolts, the object being to provide means to compensate for or absorb the bending and tensile stress induced by the expansion of the fire box sheet, and it consists in the parts and combination of parts as will be more fully explained and pointed out in the claims.

In the accompanying drawings, Figure 1 is a view partly in elevation and partly in section of my improvement. Fig. 2 is a view in section on the line *x—x* of Fig. 1; Figs. 3 and 4 are views of the spring ring bearing, and Fig. 5 is a view of a modified form.

1 represents a bolt, the underside of the head 2 of which is preferably inclined or conical as at 3. The underside may be rounded or curved either concave or convex, but I prefer the straight conical surface as shown. The shape and construction of the outer portions of the head are unimportant except that it should be provided with a slot or angular recess in its outer end for the attachment of a suitable driving tool.

Secured to the outer sheet 4 of the boiler is the sleeve 5 threaded externally, the bore at the inner end thereof being of greater diameter than the body of the bolt, and made flaring as shown so as to permit of a free lateral or rocking movement of the bolt within reasonable limits. This sleeve receives and houses the head 2 of the bolt, and is provided internally with an inclined seat 6 on which the spring tension ring 7 rests and moves. The outer end or face of the ring 7 is shaped to conform to the underside of the head of the bolt so that the bolt will have a solid and extended contact with and bearing on said ring, and the latter is preferably convex externally so as to have a free sliding movement on the inclined seat 6 of the sleeve. The ring 7 is split so that when exposed to abnormal stresses it may yield or expand and thus permit the bolt to move longitudinally a distance sufficient to compensate for the stress generated by the unequal expansion of the inner and outer sheets of the boiler, and as the ring is slidingly mounted on the inclined seat it is free to give or rock in any direction so as to follow the movements of the bolt. The sleeve is closed at its outer end by the cap 8 the lower end of which is internally threaded to engage external threads at the outer end of the sleeve, a soft metal washer 9 being preferably interposed between the cap and the outer end of the sleeve for making the joint steam tight.

In the construction shown in Fig. 5 I have shown a bolt with a head flat on the underside, and provided with a ring 10 of superior metal which may be either tight or loose on the bolt. The outer face of the ring 10 is inclined or conical and bears, as in the previous construction, on the correspondingly inclined face of the spring ring. The ring 10 forms in effect the underside of the head of the bolt, but by making it independent of the bolt head it can be made of superior or harder metal so as to decrease friction between the parts and better withstand the wear.

The spring ring 7 is of steel, spring tempered and maintains its normal shape and size when the stay bolt load or tension due to steam pressure in boiler and fire box sheets is normal. When however the inner sheet of the fire box expands ahead of the outer sheet, the stay bolt will be deflected as on line *b, b,* away from normal axis *c c,* thus putting the stay bolt under added or abnormal stress or tension due to plate expansion. When the bolt is subjected to this added stress, the split ring expands and permits the whole bolt to move inwardly, and maintain its natural length under less stress. As the plates return to normal position the ring closes and draws the bolt back to its normal position. By this arrangement the injurious effects on the bolt and also on the boiler sheets, caused by deflection of the bolt due to unequal expansion, are wholly overcome, without impairing in the least the efficiency of the device as a stay bolt.

It is evident that many slight changes might be resorted to in the relative arrangement of parts shown and described without departing from the spirit and scope of my invention, hence I would have it understood that I do not wish to confine myself to the exact construction and arrangement of parts shown and described except as required by the scope of the claims.

Having fully described my invention what I claim as new and desire to secure by Letters-Patent, is:—

1. In a flexible stay bolt construction, the combination of a sleeve having a seat therein, a stay bolt, and spring support interposed between the head of the bolt and seat in the sleeve.

2. In flexible stay bolt construction, the combination of a sleeve having a seat therein, a stay bolt and a split ring interposed between the head of the bolt and the seat in the sleeve.

3. In flexible stay bolt construction, the combination of a sleeve having a seat therein, a stay bolt and a spring ring interposed between the stay bolt head and the seat in the sleeve, and forming a yielding seat for the bolt head.

4. In flexible stay bolt construction, the combination of a sleeve having an inclined seat therein, a bolt the head of which is similarly shaped on its underside and a seat interposed between the head of the bolt and the seat in the sleeve, the said seat being adapted to contract and expand under the varying stresses to which the bolt may be subjected.

5. In flexible stay bolt construction the combination of a sleeve having an inclined seat, a stay bolt having a head also inclined on its under side and a split spring ring resting on the seat in the sleeve and supporting the head of the bolt.

6. In flexible stay bolt construction, the combination of a sleeve having an inclined seat converging rearwardly, a stay bolt, the rear part of the head of which is made separate from the forward part of the head and yielding means interposed between the seat in the sleeve and the rear face of the head of the bolt.

In testimony whereof, I have signed this specification in the presence of two subscribing witnesses.

BENJAMIN E. D. STAFFORD.

Witnesses:
EDWIN S. RYCE,
HOWARD O. CAPPEL.

Copies of this patent may be obtained for five cents each, by addressing the "Commissioner of Patents, Washington, D. C."